June 22, 1937.  F. E. LEITCH  2,084,915
SIGN
Filed March 4, 1936   2 Sheets-Sheet 1

Fred Earl Leitch
INVENTOR
BY Victor J. Evans & Co.
ATTORNEY

June 22, 1937.  F. E. LEITCH  2,084,915
SIGN
Filed March 4, 1936  2 Sheets-Sheet 2
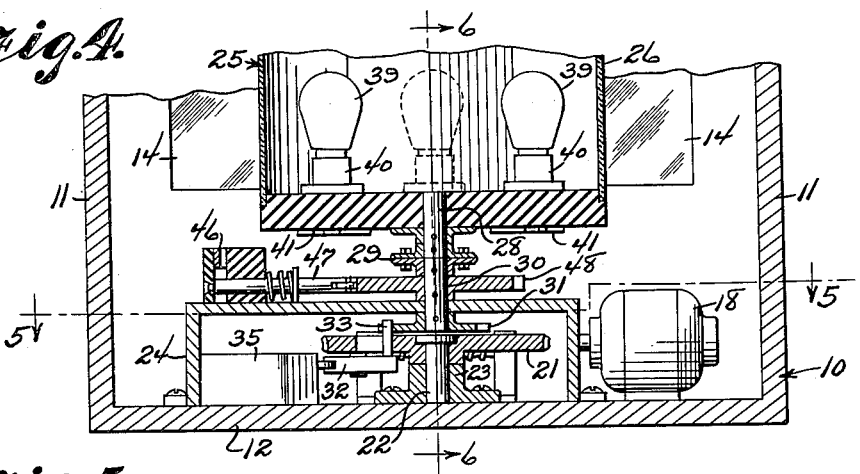
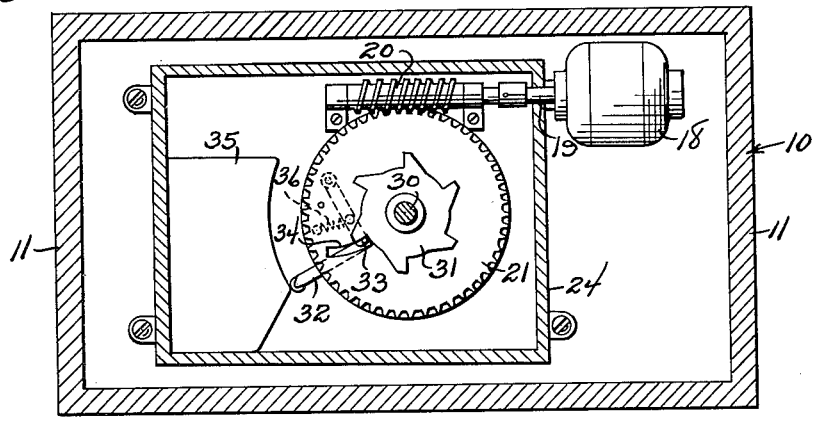
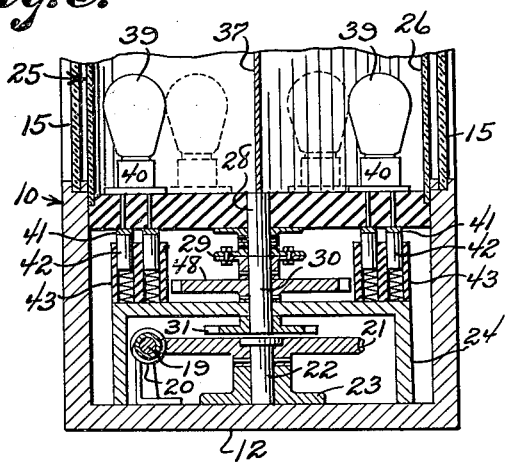
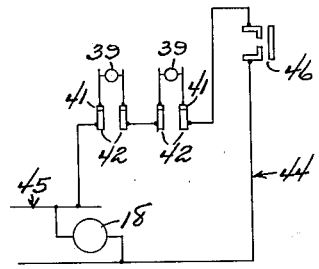
Fred Earl Leitch
INVENTOR
BY Victor J. Evans & Co.
ATTORNEY Patented June 22, 1937

2,084,915

UNITED STATES PATENT OFFICE 2,084,915

SIGN

Fred Earl Leitch, East Cleveland, Ohio

Application March 4, 1936, Serial No. 67,143

5 Claims. (Cl. 40—77)

The invention relates to a sign and more especially to an illuminated advertising device.

The primary object of the invention is the provision of a device of this character, wherein advertising mediums will be rendered visible through illumination and such illumination automatically effected intermittently so as to lend attractiveness to the device and the advertising mediums are visible from opposite sides of said device, thus a variety of advertising can be effectually displayed.

Another object of the invention is the provision of a device of this character, wherein an illuminating cylinder is rotatably supported and the illuminating bulbs carried thereby are intermittently lighted so that interrupted illumination of advertising matter will be had, the device being novel in its entirety and is susceptible of display at different localities and is possessed of a multiplicity of exhibiting mediums.

A further object of the invention is the provision of a device of this character, which is comparatively simple in construction, thoroughly reliable and efficient in its operation, neat in appearance, assuring attention of observers, automatic in the working thereof and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 4 is a fragmentary sectional view on the line 4—4 of Figure 3 looking in the direction of the arrows.

Figure 5 is a sectional view on the line 5—5 of Figure 4 looking in the direction of the arrows.

Figure 6 is a sectional view on the line 6—6 of Figure 4 looking in the direction of the arrows.

Figure 7 is a fragmentary diagrammatical plan view of the wiring and circuit layout of the device.

Similar reference characters indicate corresponding parts throughout the several views in the drawings.

Figure 8:
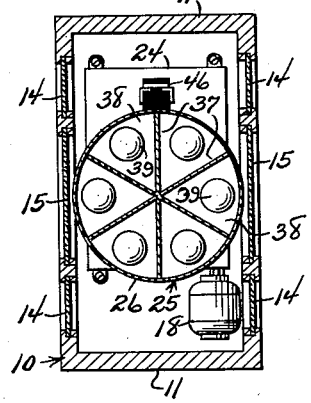
Figure 8 is a sectional view on the line 8—8 of Figure 2 looking in the direction of the arrows.
Figure 1:
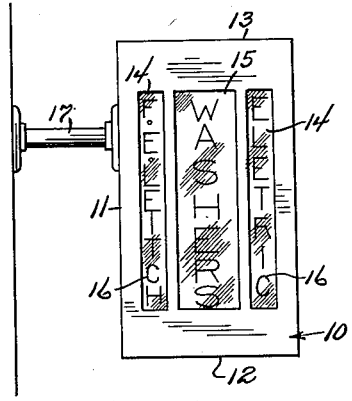
Figure 1 is an elevation of a device constructed in accordance with the invention.
Figure 2:
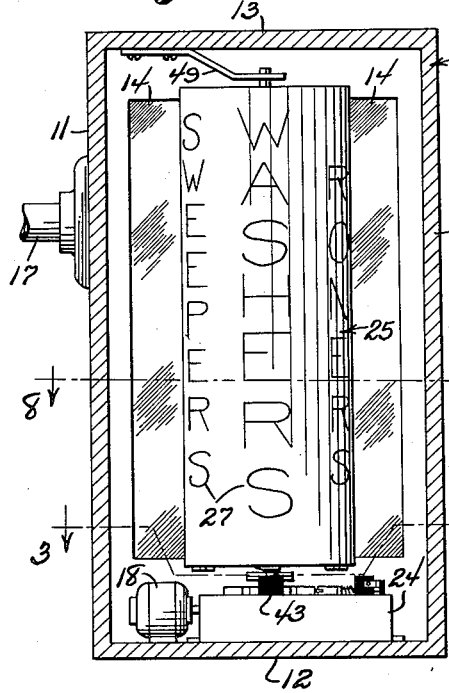
Figure 2 is an enlarged vertical sectional view through the device showing the interior thereof.
Figure 3:
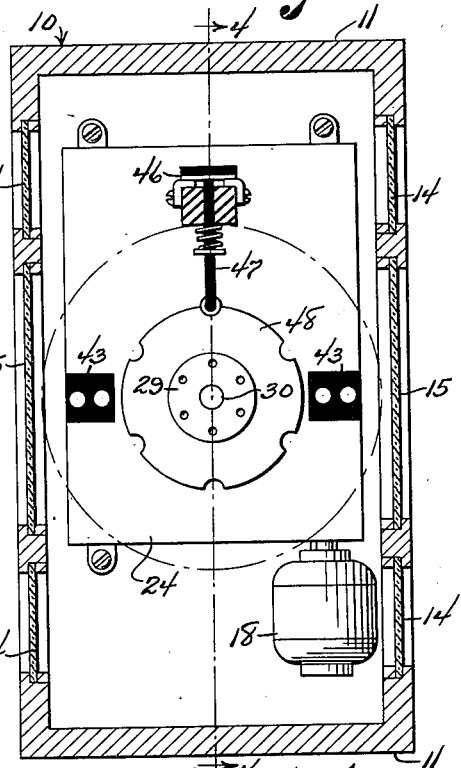
Figure 3 is a sectional view on the line 3—3 of Figure 2 looking in the direction of the arrows.

Referring to the drawings in detail, the device comprises a box-like body 10 having solid end walls 11, solid bottom 12 and solid top 13, respectively, while in the front and back of this body are fitted vertically disposed elongated outer and intermediate glass panels or window panes 14 and 15, respectively. The outer panels or panes 14 have suitably appearing thereon indicia 16, in this instance, one panel carries the word "Electric" and the other the name "F. E. Leitch" while the intermediate panel is devoid of indicia.

Fitted with one end 11 of the body 10 is a hanger 17 for mounting upon a wall or other support to suspend the device at the location required.

Located interiorly of the body 10 and fixedly supported upon its bottom 12 is an electric motor 18, its driving shaft 19 being formed with a worm screw 20 meshing with a worm gear 21 fixed to a stud shaft 22 journaled in a suitable bearing 23 stationarily supported on the bottom 12 of said body 10, the worm screw 20, its companion gear 21, the stud shaft 22 for the latter and the bearing 23 are confined within a housing 24 suitably fixed in place upon the bottom 12 interiorly of the body. Within the body 10 above the housing 24 is a rotatable cylinder 25 having the transparent cylinder wall 26 which carries the spaced vertical indicia 27 identifying certain lines of merchandise, as for example, washers, sweepers, ironers, etc., and this indicia 27 when confronting the intermediate panels or panes 15 will be rendered visible from opposite sides of the body 10 on illumination interiorly of said cylinder 25 in a manner presently described. The cylinder 25 has at its lower end a central journal 28 which through a separable coupling 29 is joined with a driven stud shaft 30 journaled in the top of the housing 24 in vertical alignment with the stud shaft 22. The stud shaft 30 has fixed thereto a ratchet gear 31, it being a six-toothed gear and is within the housing 24 while pivoted to the worm gear 21 at the under side thereof is a bell crank shaped cam actuated ratchet dog 32 having a latching pin 33 playing in a segmental shaped slot 34 in said gear 21 for engagement with the teeth of the ratchet gear 31 and this dog 32 is operated upon by a stationary cam 35 within the housing 24 for intermittent latching engagement with said gear 31. The dog 32 has connected therewith a coiled tensioning spring 36 which is also fixed to the gear 21 and automatically releases the said dog 32 from engagement with the gear 31 when the dog rides from or off of the cam 35 to free the gears 21 and 31 from each other. In this manner the cylinder 25 has intermittent movements in the rotation thereof.

The cylinder 25 has formed interiorly thereof radially disposed partitions 37 dividing it into a series of segmental shaped light compartments 38 in which are arranged or fitted electric light bulbs 39, their sockets 40 being equipped with wiping contacts 41 engageable with spring pressed wipers or brushes 42 arranged in insulator blocks 43 fitted on the top of the housing 24 in diametrically opposite relation with respect to the cylinder 25 and these wipers or brushes 42 are arranged in an electric circuit 44 while the circuit to the motor 18 is indicated at 45 in Figure 7 of the drawings. The circuit 44 has arranged therein a circuit breaker 46, it being mechanically operated by a spring tensioned trip 47 controlled from a cam wheel 48 fixed to the stud shaft 30 and this circuit breaker closes and opens the circuit 44 synchronously with the engagement and disengagement of the contacts 41 and the wipers or brushes 42 so that in this manner the bulbs 39 when those are diametrically opposite of a pair are in confronting relation to the panels or panes 15, which is the point of engagement of the contacts 41 with the brushes or wipers 42, will become illuminated and such illumination will exist for a predetermined period for exhibiting indicia present on the cylinder 25 through the panels or panes 15. The periods of rotation of the cylinder 25 are regulated by the dog 32 coacting with the cam 35 and the ratchet wheel 31.

The illumination of a pair of bulbs 39 is controlled by the contact 41 and brushes or wipers 42 while coacting with these is the circuit breaker 46 to open the circuit the instant that the cylinder 25 turns for immediate cutting off of illumination to the bulbs 39.

The device under the illumination display is readable from opposite sides, that is to say, at the front and rear of the body 10 and the indicia 27 on the cylinder when illuminated will be clearly discernible through the panels 15 at the front and rear of the body 10 of the device.

The cylinder 25 at its top has a spindle journaled in a suitable bracket or bearing 49 therefor as carried interiorly of the body 10.

The circuit breaker 46 controls the circuit 44 to the lights while the circuit 45 to the motor 18 is undisturbed by this circuit breaker.

As has been hereinbefore indicated the dog 32 is latched with the gear 31 when acted upon by the cam 35 while the spring 36 automatically releases the dog 32 from the gear 31 after the dog has passed from the cam 35 and the rotation of the cylinder 25 is regulated through this action.

What is claimed is:

1. A sign comprising a casing having a plurality of windows, a rotatable cylinder in said casing, said cylinder having a plurality of compartments to successively confront said windows, each compartment bearing an exhibit for display through the windows, separate electric illuminators in each of said compartments of the cylinder, a source of electric supply for said electric illuminators, a connecting means adjacent to each window for conducting current from the source of supply to the electric illuminators in the compartment confronting the windows when the exhibits thereon are in display positions, and means for rotating the cylinder by intermittent steps to successively position the compartments in front of the windows with their exhibits in the display positions.

2. A sign comprising a casing having a window, a rotatable cylinder in said casing, said cylinder having a plurality of compartments to successively confront said window, each compartment bearing an exhibit for display through the window, separate electric illuminators in each of said compartments of the cylinder, a source of electric supply for said electric illuminators, a connecting means adjacent to the window for conducting current from the source of supply to the electric illuminator in the compartment confronting the window, when the exhibit thereon is in display position, and means for rotating the cylinder by intermittent steps to successively position the compartments in front of the window with their exhibits in the display position.

3. A sign comprising a casing having a window, a rotatable cylinder in said casing, said cylinder having a plurality of compartments to successively confront said window, each compartment bearing an exhibit for display through the window, separate electric illuminators in each of said compartments of the cylinder, a source of electric supply for said electric illuminators, a connecting means adjacent to the window for conducting current from the source of supply to the electric illuminator in the compartment confronting the window comprising contact means connected with each electric illuminator and exposed from an end of each compartment and stationary contact means connected with the source of electric supply carried by the casing and adapted to be engaged by the contact means connected with the lamp in the compartment confronting the window when the exhibit thereon is in display position, and means for rotating the cylinder by intermittent steps to successively position the compartments in front of the window with their exhibits in the display position.

4. A sign comprising a casing having a window, a rotatable cylinder in said casing, said cylinder having a plurality of compartments to successively confront said window, each compartment bearing an exhibit for display through the window, separate electric illuminators in each of said compartments of the cylinder, a source of electric supply for said electric illuminators, a connecting means adjacent to the window for conducting current from the source of supply to the electric illuminator in the compartment confronting the window comprising contact means connected with each electric illuminator and exposed from an end of each compartment and stationary contact means connected with the source of electric supply carried by the casing and adapted to be engaged by the contact means connected with the lamp in the compartment confronting the window when the exhibit thereon is in display position, means for rotating the cylinder by intermittent steps to successively position the compartments in front of the window with their exhibits in the display position, a cam carried by the cylinder having detents therein corresponding to the compartments, a stationary switch in the source of electric supply for the electric illuminators, and said switch having a trip adapted to engage the detents for closing the switch, whereby the electric supply to the contact means carried by the casing is interrupted during the movements of the cylinder.

5. A sign in accordance with claim 9 in which the casing is provided with non-changing exhibitors on either side of the window through which the successive exhibits on the cylinder are displayed.

FRED EARL LEITCH.